(12) United States Patent
Ell

(10) Patent No.: US 9,163,905 B2
(45) Date of Patent: Oct. 20, 2015

(54) DUAL-MODE SAL/IR IMAGING

(71) Applicant: Rosemount Aerospace Inc., Burnsville, MN (US)

(72) Inventor: Todd A. Ell, Savage, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 95 days.

(21) Appl. No.: 13/898,046

(22) Filed: May 20, 2013

(65) Prior Publication Data

US 2014/0312161 A1    Oct. 23, 2014

Related U.S. Application Data

(60) Provisional application No. 61/650,700, filed on May 23, 2012.

(51) Int. Cl.
    *F41G 7/22*     (2006.01)
    *F41G 7/00*     (2006.01)
    *G01S 3/781*     (2006.01)

(52) U.S. Cl.
CPC .............. *F41G 7/2246* (2013.01); *F41G 7/008* (2013.01); *F41G 7/226* (2013.01); *F41G 7/2253* (2013.01); *F41G 7/2293* (2013.01); *G01S 3/781* (2013.01); *Y10T 29/49002* (2015.01)

(58) Field of Classification Search
CPC ........... G01S 3/78; G01S 3/781; F41G 7/008; F41G 7/20; F41G 7/22; F41G 7/2246; F41G 7/2253; F41G 7/226; F41G 7/2276; F41G 7/2293; Y10T 29/49; Y10T 29/49002
USPC .............. 244/3.1, 3.15–3.19; 250/200, 201.1, 250/203.1, 206, 208.1, 336.1, 338.1, 250/339.01, 339.02, 339.14; 343/700 R, 725
See application file for complete search history.

(56) References Cited

U.S. PATENT DOCUMENTS 4,615,496 A    10/1986    Pinson
5,681,009 A    10/1997    Vandersteen et al.
(Continued)

FOREIGN PATENT DOCUMENTS

WO    WO-2012/005781 A2    1/2012

OTHER PUBLICATIONS

Extended European Search Report dated Sep. 5, 2013 for European Application No. EP 13168997.8.
(Continued)

*Primary Examiner* — Bernarr Gregory
(74) *Attorney, Agent, or Firm* — Locke Lord LLP; Scott D. Wofsy; Joshua L. Jones

(57) ABSTRACT

Dual mode SAL/IR imaging seekers are described herein. In some embodiments, a dual-mode SAL/IR imaging seeker described herein includes a focal plane array (FPA), an objective optical assembly providing a common optical path to the FPA for incident laser radiation of a first wavelength band and incident ambient radiation of a second wavelength band non-overlapping with the first wavelength band, a first optical filter operable to selectively pass the incident laser radiation to the FPA in a transmissive mode and selectively block the incident laser radiation from the FPA in a non-transmissive mode and a second optical filter assembly operable to selectively pass the incident ambient radiation to the FPA in a transmissive mode and selectively block the incident ambient radiation from the FPA in a non-transmissive mode.

17 Claims, 3 Drawing Sheets

(56) References Cited

U.S. PATENT DOCUMENTS

| | | | |
|---|---|---|---|
| 6,262,800 B1 | 7/2001 | Minor | |
| 6,489,635 B1 | 12/2002 | Sugg | |
| 6,573,581 B1 | 6/2003 | Sugg et al. | |
| 6,924,772 B2 * | 8/2005 | Kiernan et al. | 343/725 |
| 7,145,124 B2 * | 12/2006 | Garrood et al. | 250/208.1 |
| 7,183,966 B1 * | 2/2007 | Schramek et al. | 244/3.16 |
| 7,575,191 B2 | 8/2009 | Layton | |
| 7,858,939 B2 | 12/2010 | Tener et al. | |
| 7,999,230 B2 * | 8/2011 | Cole | 250/338.1 |
| 8,164,037 B2 | 4/2012 | Jenkins et al. | |
| 8,188,411 B2 | 5/2012 | McCarthy | |
| 8,274,027 B2 | 9/2012 | Andressen et al. | |
| 8,829,404 B1 * | 9/2014 | Rinker | 250/203.1 |
| 2004/0008391 A1 | 1/2004 | Bowley et al. | |
| 2008/0112594 A1 | 5/2008 | Williams et al. | |
| 2008/0309801 A1 | 12/2008 | Cuccias | |
| 2010/0141503 A1 | 6/2010 | Baumatz | |
| 2010/0231997 A1 | 9/2010 | Fontecchio et al. | |
| 2010/0264253 A1 | 10/2010 | Taylor et al. | |
| 2011/0073704 A1 | 3/2011 | Jenkins et al. | |
| 2012/0261553 A1 | 10/2012 | Elkind et al. | |

OTHER PUBLICATIONS

Sutherland, Richard L et al: "Liquid Crystal Bragg Filters", Emerging Liquid Crystal Technologies VI, SPIE vol. 7955 dated Feb. 10, 2011, pp. 1-12.

* cited by examiner

DUAL-MODE SAL/IR IMAGING

CROSS-REFERENCE TO RELATED APPLICATIONS

This application claims priority to U.S. Provisional Patent Application No. 61/650,700, filed May 23, 2012, which is incorporated by reference herein in its entirety.

BACKGROUND OF THE INVENTION

1. Field of the Invention

The present invention relates to optical tracking and imaging systems and, in particular, to optical tracking and imaging systems for weapon guidance.

2. Description of Related Art

Semi-active laser (SAL) detection or tracking systems are used by the military to support precision laser-guided weapons. With a SAL system, a narrow laser beam of energy is produced and transmitted toward a target. The laser radiation is typically generated and transmitted from a laser target designator (LTD) manned by a forward observer. The forward observer directs the laser radiation to the selected target, thereby designating the target. The SAL seeking system of the laser guided weapon, remotely located from the target and designator, can detect the laser radiation reflected from the target and assists in guiding the weapon to the target. A significant disadvantage to weapon delivery techniques using SAL systems is the requirement the forward observer maintain laser target designation until weapon impact for acceptable accuracy.

In view of this disadvantage, contrast imaging seekers are available for precision guided weapon delivery. Such imaging seekers rely on automatic target tracking algorithms that distinguish an image of the target from background clutter under ambient lighting. The ability to passively track the target through imaging precludes active target designation by a forward observer. However, passively acquiring targets is difficult, often requiring highly sophisticated automatic target acquisition/recognition (ATA/ATR) algorithms with demanding processing resources. Moreover, passive imaging systems can encounter significant tracking problems when the target undergoes rapid changes in illumination.

Such conventional methods and systems have generally been considered satisfactory for their intended purpose. However, there is still a need in the art for systems and methods that allows for improved tracking. There also remains a need in the art for such systems and methods that are easy to make and use. The present invention provides a solution for these problems.

SUMMARY OF THE INVENTION

New and useful dual-mode SAL/IR imaging seekers are operable to mitigate one or more of the foregoing disadvantages of SAL seekers and/or contrast imaging seekers. Moreover, dual-mode SAL/IR imaging seekers described herein, in some embodiments, demonstrate a simplified construction and operation providing further advantages over current dual-mode systems employing dual optical assemblies, dual sensing elements and/or divided focal plane arrays.

In some embodiments, a dual-mode SAL/IR imaging seeker described herein includes a focal plane array (FPA), an objective optical assembly providing a common optical path to the FPA for incident laser radiation of a first wavelength band and incident ambient radiation of a second wavelength band non-overlapping with the first wavelength band, a first optical filter operable to selectively pass the incident laser radiation to the FPA in a transmissive mode and selectively block the incident laser radiation from the FPA in a non-transmissive mode and a second optical filter assembly operable to selectively pass the incident ambient radiation to the FPA in a transmissive mode and selectively block the incident ambient radiation from the FPA in a non-transmissive mode. In some embodiments, the first optical filter and the second optical filter assembly are independently electrically switchable between the radiation transmissive and radiation non-transmissive modes.

In another aspect, weapons are described herein including precision guidance capabilities. A guided weapon, in some embodiments, includes a body, one or more flight control surfaces on the body and a dual-mode SAL/IR imaging seeker including a FPA, an objective optical assembly providing a common optical path to the FPA for incident laser radiation of a first wavelength band and incident ambient radiation of a second wavelength band non-overlapping with the first wavelength band, a first optical filter operable to selectively pass the incident laser radiation to the FPA in a transmissive mode and selectively block the incident laser radiation from the FPA in a non-transmissive mode and a second optical filter assembly operable to selectively pass the incident ambient radiation to the FPA in a transmissive mode and selectively block the incident ambient radiation from the FPA in a non-transmissive mode. In some embodiments, the dual-mode SAL/IR imaging seeker further includes processing electronics operable to provide at least one guidance signal or command to the guided weapon derived from sensed laser radiation of the first wavelength band and/or infrared radiation of the second wavelength band.

In another aspect, methods of making a dual mode SAL/IR imaging seeker are described herein. Fabrication methods described herein, in some embodiments, provide advantages over prior dual-mode SAL/IR seeker fabrication methods employing multiple optical systems, split optical paths, multiple detectors or divided FPAs. In some embodiments, a method of making a dual-mode SAL/IR imaging seeker includes providing a FPA, providing an objective optical assembly establishing a common optical path to the FPA for incident laser radiation of a first wavelength band and incident ambient radiation of a second wavelength band non-overlapping with the first wavelength band, positioning a first optical filter in the common optical path operable to selectively pass the incident laser radiation to the FPA in a transmissive mode and selectively block the incident laser radiation from the FPA in a non-transmissive mode and positioning a second optical filter assembly in the common optical path operable to selectively pass the incident ambient radiation to the FPA in a transmissive mode and selectively block the incident ambient radiation from the FPA in a non-transmissive mode.

In a further aspect, methods of guiding a weapon to a target are described herein. In some embodiments, a method of guiding a weapon to a target includes providing the weapon a dual-mode SAL/IR imaging seeker including a FPA, an objective optical assembly providing a common optical path to the FPA for incident laser radiation of a first wavelength band and incident ambient infrared radiation of a second wavelength band non-overlapping with the first wavelength band, a first optical filter operable to selectively pass the incident laser radiation to the FPA in a transmissive mode and selectively block the incident laser radiation from the FPA in a non-transmissive mode and a second optical filter assembly operable to selectively pass the incident ambient infrared radiation to the FPA in a transmissive mode and selectively block the incident ambient infrared radiation from the FPA in a non-transmissive mode. The target is actively acquired and tracked with the dual-mode SAL/IR imaging seeker by isolating or substantially isolating target reflected laser radiation of the first wavelength band from target reflected ambient infrared radiation and sensing the isolated laser radiation with the FPA.

In some embodiments, isolating the target reflected laser radiation of the first wavelength band includes placing the first optical filter in the transmissive mode and placing the second optical filter assembly in the non-transmissive mode. Moreover, in some embodiments, a method of guiding the weapon to the target further includes switching from active tracking of the target to passive imaging and tracking of the target with the SAL/IR imaging seeker by selectively blocking the target reflected laser radiation from the FPA and passing the ambient infrared radiation reflected from the target to the FPA. In some embodiments, selectively blocking the reflected target laser radiation and passing the reflected target ambient infrared radiation includes placing the first optical filter in the non-transmissive mode and placing the second optical filter assembly in transmissive mode.

Additionally, in some embodiments, a method of guiding the weapon to the target further includes alternating between active tracking and passive tracking of the target until the weapon is delivered to the target. Alternatively, in some embodiments, alternating between active tracking and passive tracking is carried out until passive imaging resolves the target to a predetermined threshold. Once the predetermined target resolution threshold is met, passive tracking can be continued until the weapon is delivered to the target. Further, in some embodiments, a method of guiding the weapon to the target further includes alternating between active tracking or passive tracking or full imaging of the target until the weapon is delivered to the target.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION OF THE PREFERRED EMBODIMENTS

Embodiments described herein can be understood more readily by reference to the following detailed description and previous and following descriptions. Elements, apparatus and methods described herein, however, are not limited to the specific embodiments presented in the detailed description. It should be recognized that these embodiments are merely illustrative of the principles of the present invention. Numerous modifications and adaptations will be readily apparent to those of skill in the art without departing from the spirit and scope of the invention.

Figure 1:
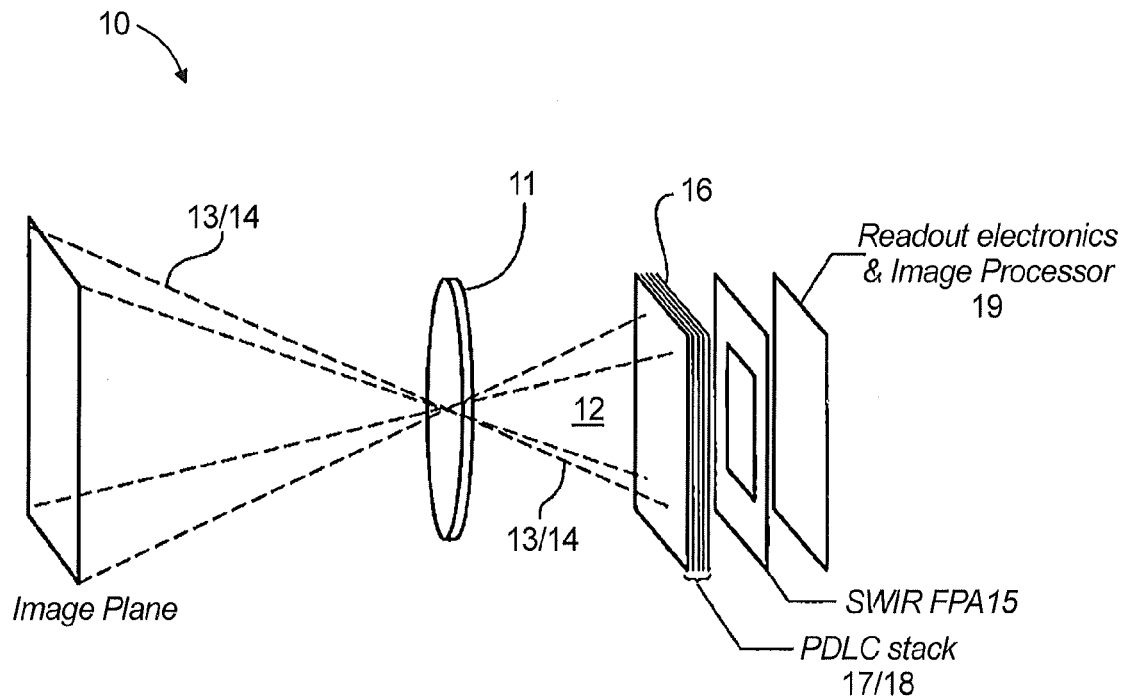
FIG. 1 is a schematic view of and exemplary embodiment of a dual-mode SAL/IR imaging seeker constructed in accordance with the present invention.

Reference will now be made to the drawings wherein like reference numerals identify similar structural features or aspects of the subject invention. For purposes of explanation and illustration, and not limitation, a partial view of an exemplary embodiment of a dual-mode SAL/IR imaging seeker in accordance with the invention is shown in FIG. 1 and is designated generally by reference character 10. Other embodiments of imaging seekers in accordance with the invention, or aspects thereof, are provided in FIGS. 2-4, as will be described. The systems and methods described herein can be used to improve tracking, for example under changing light conditions.

I. Dual Mode SAL/IR Imaging Seeker

In one aspect, dual-mode SAL/IR imaging seekers are described herein which, in some embodiments, are operable to mitigate one or more of the foregoing disadvantages of prior SAL seekers and/or contrast imaging seekers. Additionally, dual-mode SAL/IR imaging seekers described herein, in some embodiments, are single-boresighted demonstrating a simplified construction and operation providing further advantages over current dual-mode systems employing dual optical assemblies, dual sensing elements and/or divided FPAs.

In some embodiments, a dual-mode SAL/IR imaging seeker includes a FPA, an objective optical assembly providing a common optical path to the FPA for incident laser radiation of a first wavelength band and incident ambient radiation of a second wavelength band non-overlapping with the first wavelength band, a first optical filter operable to selectively pass the incident laser radiation to the FPA in a transmissive mode and selectively block the incident laser radiation from the FPA in a non-transmissive mode and a second optical filter assembly operable to selectively pass the incident ambient radiation to the FPA in a transmissive mode and selectively block the incident ambient radiation from the FPA in a non-transmissive mode. In some embodiments, the first optical filter and the second optical filter assembly are independently electrically switchable between the radiation transmissive and radiation non-transmissive modes. FIG. 1 illustrates a dual-mode SAL/IR imaging seeker according to one embodiment described herein. The dual-mode SAL/IR imaging seeker (10) includes an objective optical assembly (11) providing a single, common optical path (12) to a single FPA (15) for incident laser radiation (13) of a first wavelength band and incident ambient infrared radiation (14) of a second wavelength band non-overlapping with the first wavelength band. In traveling a common optical path (12) to the FPA (15), the incident laser radiation (13) and infrared radiation (14), in some embodiments do not encounter beam splitting apparatus selectively directing or diverting the laser radiation (13) and infrared radiation (14) along separate optical paths and/or through separate optical assemblies to reach the FPA (15). In the embodiment illustrated in FIG. 1, an optical filter stack (16) is positioned between the objective optical assembly (11) and the FPA (15). The optical filter stack includes a first optical filter (17) operable to selectively pass the incident laser radiation (13) to the FPA in a transmissive mode and selectively block the incident laser radiation (13) from the FPA in a non-transmissive mode. The optical filter stack (16)

also includes a second optical filter assembly (18) operable to selectively pass the incident ambient radiation (14) to the FPA (15) in a transmissive mode and selectively block the incident ambient radiation (14) from the FPA (15) in a non-transmissive mode. As described further herein, the optical filter stack (16) can be positioned in any location of the dual-mode SAL/IR imaging seeker satisfying the criterion that the incident laser radiation (13) and incident ambient radiation (14) encounter the filter stack (16) prior to reaching the FPA (15). In some embodiments, for example, the optical filter stack (16) is positioned in front of the objective optical assembly (11). In some embodiments, the optical filter stack (16) is fabricated on an upstream or downstream surface of the optical assembly (11).

In some embodiments, the optical filter stack (16) is fabricated on the FPA (15). Additionally, in some embodiments, discrete optical filter stacks (16) are fabricated on individual pixels or groups of pixels of the FPA (15) permitting wavelength filtering at the pixel level. Alternatively, in some embodiments, the first optical filter (17) and the second optical filter assembly (18) are provided as individual components and are not in a singular stacked configuration. Separating the first optical filter (17) and the second optical filter assembly (18) can facilitate their independent placement in the common optical path (12) of the dual-band SAL/IR imaging seeker (10).

The dual-mode SAL/IR imaging seeker (10) of FIG. 1 further includes readout electronics, such as a readout integrated circuit (ROIC), and image processor (19) in electrical communication with the FPA (15).

Turning now to specific components, a dual-mode SAL/IR imaging seeker described herein includes an optical assembly providing a common optical path to the FPA for incident laser radiation of the first wavelength band and incident ambient radiation of the second wavelength band non-overlapping with the first wavelength band. In some embodiments, the optical assembly includes a single lens. A suitable lens, in some embodiments, includes a positive or converging lens. In some embodiments, for example, a lens is selected from the group consisting of biconvex lenses and plano-convex lenses. In some embodiments, the optical assembly includes a compound lens. The dual-mode SAL/IR imaging seeker includes a FPA operable to detect the incident laser radiation of the first wavelength band and the incident ambient radiation of the second wavelength band. In some embodiments, the FPA is responsive to radiation having a wavelength in the short-wave infrared (SWIR) region of the electromagnetic spectrum. In some embodiments, for example, the FPA is responsive to radiation having a wavelength ranging from about 700 nm to about 1700 nm. The FPA, in some embodiments, is responsive to radiation having a wavelength ranging from about 3 µm to about 5 µm, corresponding to the mid-wavelength infrared (MWIR) region of the electromagnetic spectrum.

In some embodiments, the FPA includes any desired number of pixels including semiconductor materials in the formation of pn junctions or p-i-n junctions.

In some embodiments, semiconductor materials used in the formation of pixel heterojunctions include binary or ternary Group III/V semiconductors, Group II/VI semiconductors or combinations thereof. In one embodiment wherein the detection of SWIR is desired, a FPA is constructed of InGaAs, such as $In_{0.53}Ga_{0.47}As$. In some embodiments, the FPA is constructed according to the materials and methods disclosed in U.S. Pat. Nos. 6,573,581 and/or 6,489,635 which are incorporated herein by reference in their entireties.

As described herein, the FPA, in some embodiments is undivided between sensing laser radiation of the first wavelength band and ambient infrared radiation of the second wavelength band, i.e. for combined sensing of laser radiation and imaging of infrared radiation on a single undivided FPA. In remaining undivided, maximum sensing operability for the laser radiation is available. Further, maximum resolution ability is available for imaging the infrared radiation of the second wavelength band. Therefore, a time-division multiplexed imager is described herein operable to separate incident LTD laser radiation from ambient infrared radiation for target acquisition and tracking applications. Readout electronics and image processor apparatus are coupled to the FPA for processing and quantifying radiation signals produced by the FPA.

The dual-mode SAL/IR imaging seeker also includes a first optical filter operable to selectively pass incident laser radiation of the first wavelength band to the FPA in a transmissive mode and selectively block the incident laser radiation from the FPA in a non-transmissive mode. The incident laser radiation of the first wavelength band, in some embodiments, is laser radiation scattered from a target actively designated by a forward observer. Therefore, in some embodiments, the first wavelength band selectively passed or blocked by the first optical filter encompasses a laser wavelength employed in target designation from LTDs. In some embodiments, for example, the first wavelength band encompasses wavelengths from about 845 nm to about 855 nm or from about 1060 nm to about 1070 nm. The first wavelength band, in some embodiments, encompasses wavelengths ranging from about 1490 nm to about 1510 nm. A dual-mode SAL/IR imaging seeker described herein can include a separate first optical filter for each LTD wavelength. In some embodiments, for example, a dual-mode SAL/IR imaging seeker includes three first optical filters, one responsive to LTD radiation of 850 nm, one responsive to LTD radiation of 1064 nm and one responsive to LTD radiation of 1500 nm.

In conjunction with one or more first optical filters responsive to LTD radiation, the dual-mode SAL/IR imaging seeker includes a second optical filter assembly operable to selectively pass incident ambient radiation of a second wavelength band to the FPA in a transmissive mode and selectively block the incident ambient radiation from the FPA in a non-transmissive mode, wherein the second wavelength band does not overlap or substantially overlap with the first wavelength band. The incident ambient radiation of the second wavelength band, in some embodiments, includes ambient infrared radiation reflected from a target actively designated by a forward observer with laser radiation in the first wavelength band. Therefore, in some embodiments, the second wavelength band includes wavelengths flanking the first wavelength band of the scattered laser radiation. In some embodiments, for example, when the first wavelength band ranges from about 845 nm to about 855 nm, the second wavelength band covers the remainder of the SWIR spectrum ranging from about 700 nm to about 845 nm and from about 855 nm to about 1700 nm. Similarly, when the first wavelength band ranges from about 1060 nm to about 1070 nm, the second wavelength band ranges from about 700 nm to about 1060 nm and from about 1070 nm to about 1700 nm. In some embodiments when the first wavelength band ranges from about 1495 nm to about 1505 nm, the second wavelength band ranges from about 700 nm to about 1495 nm and from about 1505 nm to about 1700 nm.

The first optical filter(s) and the second optical filter assembly, in some embodiments, include one or more thin films of polymeric material. In some embodiments, the thin films of polymeric material include holographic polymer dispersed liquid crystals (H-PDLC). PDLC films are electro-optical devices which can be switched between a transparent or substantially transparent state and a non-transparent or light scattering state in narrow wavelength bands. Suitable H-PDLC materials, in some embodiments, are described in United States Patent Application Publication 2010/0231997, which is incorporated by reference in its entirety.

Given the narrow range of the first wavelength band, a first optical filter, in some embodiments, includes a single-layer H-PDLC. However, given the breadth of the second wavelength band, the second optical filter assembly can include multiple layers of H-PDLC, each layer covering a subset of wavelengths of the second band. In some embodiments, for example, the second optical filter assembly includes 2 to 10 individual layers of H-PDLC. In one embodiment wherein the second optical filter assembly covers the remainder of the SWIR spectrum as described above, the second optical filter assembly includes 4 individual layers of H-PDLC. In some embodiments, the bandwidth of a single-layer H-PDLC ranges from about 10 nm to about 200 nm.

Figure 2:
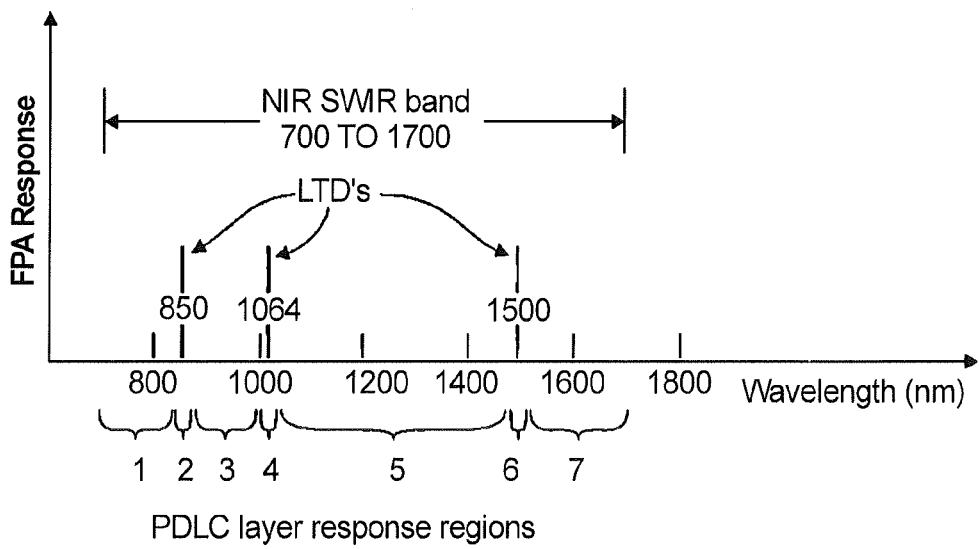
FIG. 2 is a graph of wavelength response of first optical filters and a second optical filter assembly of a SAL/IR imaging seeker across the SWIR spectrum according to one embodiment described herein.

FIG. 2 illustrates wavelength response of first optical filters and a second optical filter assembly of a SAL/IR imaging seeker across the SWIR spectrum according to one embodiment described herein. As illustrated in FIG. 2, the SAL/IR imaging seeker includes three first optical filters, one responsive to LTD radiation of 850 nm, one responsive to LTD radiation of 1064 nm and one responsive to LTD radiation of 1500 nm. The three first optical filters cover the respective wavelength bands 2, 4 and 6. As described herein, each of the first optical filters can include a layer of H-PDLC operable to selectively pass the corresponding LTD radiation in a transmissive mode and block the LTD radiation in a non-transmissive mode. In including H-PDLC, each of the first optical filters is electrically switchable between the radiation non-transmissive mode and the transmissive mode by application of an electric field to the H-PDLC. When the electric field is applied, the H-PDLC is radiation transmissive. In the absence of an applied electric field, the H-PDLC is radiation non-transmissive. In some embodiments, the switching time between radiation and non-radiation transmissive modes is on the order tens of microseconds.

The second optical filter assembly of the SAL/IR imaging seeker is responsive to the remaining wavelengths of the SWIR spectrum as set forth by regions 1, 3, 5 and 7. As described herein, the second optical filter assembly, in some embodiments, includes multiple layers of H-PDLC, each layer operable to selectively pass and block a subset of the remaining SWIR spectrum in respective transmissive and non-transmissive modes as determined by application of an applied electric field. In some embodiments, for example, regions 1, 3, 5 and 7 each include one or more H-PDLC layers. In including H-PDLC, each subset layer is electrically switchable between the radiation transmissive mode and the non-transmissive mode. In some embodiments, the switching time between radiation and non-radiation transmissive modes is on the order tens of microseconds. Further, the subset layers, in some embodiments, are collectively switched as a unit. Alternatively, the subset layers can be switched between radiation transmissive and non-transmissive modes independent of one another.

In some embodiments, the first optical filter(s) and second optical filter assembly are provided in a singular stacked configuration as illustrated in FIG. 1. Alternatively, in some embodiments, the first optical filter(s) are spatially discrete from the second optical filter assembly. Further, in some embodiments, individual optical layers of the second optical filter assembly are spatially discrete or non-adjacent to one another.

II. Methods of Making Dual-Mode SAL/IR Imaging Seekers

In another aspect, methods of making a dual mode SAL/IR imaging seeker are described herein. Fabrication methods described herein, in some embodiments, provide advantages over prior dual-mode SAL/IR seeker fabrication methods employing multiple optical systems, split optical paths, multiple detectors or divided FPAs. In some embodiments, a method of making a dual-mode SAL/IR imaging seeker includes providing a FPA, providing an objective optical assembly establishing a common optical path to the FPA for incident laser radiation of a first wavelength band and incident ambient radiation of a second wavelength band non-overlapping with the first wavelength band, positioning a first optical filter in the common optical path operable to selectively pass the incident laser radiation to the FPA in a transmissive mode and selectively block the incident laser radiation from the FPA in a non-transmissive mode and positioning a second optical filter assembly in the common optical path operable to selectively pass the incident ambient radiation to the FPA in a transmissive mode and selectively block the incident ambient radiation from the FPA in a non-transmissive mode.

In some embodiments, the first optical filter and the second optical filter assembly are positioned in the common optical path in a singular stacked configuration as illustrated in FIG. 1. In some embodiments, a singular stack including one or more first optical filters and the second optical filter assembly is coupled to the objective optical assembly. A singular stack including first optical filter(s) and the second optical filter assembly, in some embodiments, is fabricated on or coupled to the FPA.

Alternatively, in some embodiments, one or more first optical filters are spatially discrete from the second optical filter assembly when positioned in the common optical path. Further, a dual-mode SAL/IR imaging seeker made according to methods described herein can have any properties and/or construction described in Section I hereinabove.

III. Precision Guided Weapons

In another aspect, weapons are described herein including precision guidance capabilities. A guided weapon, in some embodiments, includes a body, one or more flight control surfaces on the body and a dual-mode SAL/IR imaging seeker including a FPA, an objective optical assembly providing a common optical path to the FPA for incident laser radiation of a first wavelength band and incident ambient radiation of a second wavelength band non-overlapping with the first wavelength band, a first optical filter operable to selectively pass the incident laser radiation to the FPA in a transmissive mode and selectively block the incident laser radiation from the FPA in a non-transmissive mode and a second optical filter assembly operable to selectively pass the incident ambient radiation to the FPA in a transmissive mode and selectively block the incident ambient radiation from the FPA in a non-transmissive mode. In some embodiments, the dual-mode SAL/IR imaging seeker further includes processing electronics operable to provide at least one guidance signal or command to the weapon derived from sensed laser radiation of the first wavelength band and/or infrared radiation of the second wavelength band.

Turning now to specific components, a guided weapon described herein includes a body. Any suitable body for carrying and delivering explosives can be used. In some embodiments, a body includes one or more cylindrical, elliptical and/or conical components. Further, the body includes one or more flight control surfaces coupled thereto or integrated therewith. In some embodiments, flight control surfaces include one or more canards, fins, wings, ailerons, elevators, spoilers, air brakes or other aerodynamic surfaces operable to direct the flight path of the guided weapon.

The guided weapon also includes a dual-mode SAL/IR imaging seeker described herein and associated processing electronics operable to provide at least one guidance signal or command to the weapon derived from laser radiation of the first wavelength band and/or infrared radiation of the second wavelength band sensed with the dual-mode SAL/IR seeker. The dual-mode SAL/IR imaging seeker can have any properties and/or construction set forth in Section I hereinabove. The dual-mode SAL/IR imaging seeker can be coupled to or integrated with the body of the weapon in any desired manner. In some embodiments, the dual-mode SAL/IR imaging seeker is integrated with the body of the weapon in a spatial orientation favorable for receiving LTD radiation and/or ambient infrared radiation from a target. In one embodiment, for example, the dual-mode SAL/IR imaging seeker is arranged under a radiation transmissive dome on the target facing end of the weapon body.

In some embodiments, a guided weapon described herein is self-propelled. In some embodiments, for example, the guided weapon is a missile or unmanned aerial vehicle carrying an explosive payload. Additionally, in some embodiments, a guided weapon is not self-propelled. In some embodiments, the guided weapon is a projectile fired from an apparatus or dropped from an aerial vehicle.

IV. Methods of Guiding a Weapon to a Target

Figure 3:
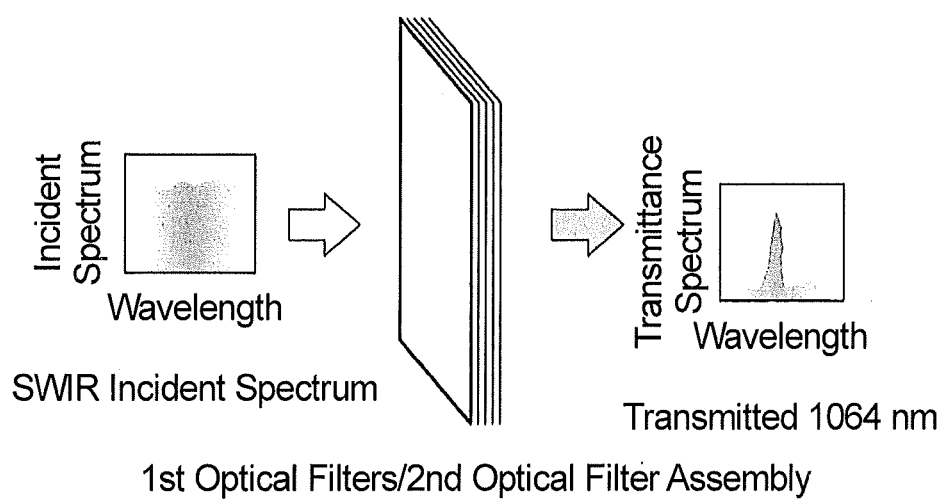
FIG. 3 schematically illustrates isolating target reflected laser radiation according to one embodiment described herein.

In a further aspect, methods of guiding a weapon to a target are described herein. In some embodiments, a method of guiding a weapon to a target includes providing the weapon a dual-mode SAL/IR imaging seeker including a FPA, an objective optical assembly providing a common optical path to the FPA for incident laser radiation of a first wavelength band and incident ambient radiation of a second wavelength band non-overlapping with the first wavelength band, a first optical filter operable to selectively pass the incident laser radiation to the FPA in a transmissive mode and selectively block the incident laser radiation from the FPA in a non-transmissive mode and a second optical filter assembly operable to selectively pass the incident ambient infrared radiation to the FPA in a transmissive mode and selectively block the incident ambient infrared radiation from the FPA in a non-transmissive mode. The target is actively acquired and tracked with the dual-mode SAL/IR imaging seeker by isolating or substantially isolating target reflected laser radiation of the first wavelength band from target reflected ambient infrared radiation and sensing the isolated laser radiation with the FPA. The target reflected laser radiation, in some embodiments, is scattered LTD radiation. In some embodiments, isolating the target reflected laser radiation of the first wavelength band includes placing the first optical filter in the transmissive mode and placing the second optical filter assembly in the non-transmissive mode. FIG. 3 illustrates isolating target reflected laser radiation according to one embodiment described herein. In the embodiment of FIG. 3, the first optical filter responsive to reflected LTD radiation and the second optical filter assembly responsive to the remainder of the incident spectrum detectable by the FPA are provided in a singular stacked element. The stacked element can have a wavelength response profile as provided in FIG. 2. The stacked element, for example, can include three first optical filters, one responsive to LTD radiation of 850 nm, one responsive to LTD radiation of 1064 nm and one responsive to LTD radiation of 1500 nm. The three first optical filters cover the respective wavelength bands 2, 4 and 6. As described herein, each of the first optical filters can include a layer of H-PDLC operable to selectively pass the corresponding LTD radiation in a transmissive mode and block the LTD radiation in a non-transmissive mode.

The second optical filter assembly of the SAL/IR imaging seeker is responsive to the remaining wavelengths of the incident SWIR spectrum as set forth by regions 1, 3, 5 and 7. As described herein, the second optical filter assembly, in some embodiments, includes multiple layers of H-PDLC, each layer operable to selectively pass and block a subset of the remaining SWIR spectrum in respective transmissive and non-transmissive modes. In some embodiments, for example, regions 1, 3, 5 and 7 each include one or more H-PDLC layers.

In order to pass target reflected LTD radiation of 1064 nm, for example, the first optical filter responsive to 1064 nm radiation (4) is set to the radiation transmissive mode and the remaining first optical filters of 850 nm (2) and 1500 nm (6) in addition to the second optical filter assembly covering the remaining incident SWIR spectrum (1, 3, 5 and 7) are set to the non-transmissive mode. The 1064 nm LTD radiation is passed to the FPA while the remaining SWIR spectrum is blocked. Incident LTD radiation of 850 nm and 1500 nm can be selectively passed to the FPA by similar methods.

Moreover, in some embodiments, a method of guiding the weapon to the target further includes switching from active tracking of the target to passive imaging and tracking of the target with the SAL/IR imaging seeker by selectively blocking the target reflected laser radiation from the FPA and passing the ambient infrared radiation reflected from the target to the FPA. In some embodiments, selectively blocking the reflected target laser radiation and passing the reflected target ambient infrared radiation includes placing the first optical filter in the non-transmissive mode and placing the second optical filter assembly in transmissive mode.

In the context of FIG. 2, the first optical filters responsive to LTD radiation of 850 nm (2), 1064 nm (4) and 1500 nm (6) are placed in the non-radiation transmissive mode, and the second optical assembly responsive to ambient SWIR infrared radiation (1, 3, 5 and 7) reflected from the target is placed in the radiation transmissive mode for passive imaging of the target. In some embodiments, a first optical filter can remain in transmissive mode if it is determined that LTD radiation to be blocked by the filter is not pre-sent in the target environment.

The ability to block LTD radiation can facilitate passive imaging with dual-mode SAL/IR imaging seekers described herein by eliminating or reducing rapid changes in target illumination, which often causes loss of target track. Additionally, in some embodiments, a method of guiding the weapon to the target further includes switching from active tracking or passive tracking of the target to full imaging of the target with the SAL/IR seeker. In such embodiments, the first optical filter(s) and second optical filter assembly are respectively set to transmissive modes thereby permitting the passage target reflected laser radiation of the first wavelength band and target reflected ambient infrared radiation of the second wavelength band. With reference to FIG. 2, for example, one or more of the three first optical filters (850 nm, 1064 nm and 1500 nm) are set to the transmissive mode to pass target reflected laser radiation to the FPA. The second optical filter assembly of the SAL/IR imaging seeker responsive to the remaining wavelengths of the incident SWIR spectrum as set forth by regions 1, 3, 5 and 7 is also set to the transmissive mode to pass target reflected ambient infrared radiation to the FPA.

Further, in some embodiments, a method of guiding the weapon to the target further includes alternating between active tracking or passive tracking or full imaging of the target until the weapon is delivered to the target. Alternatively, in some embodiments, alternating between active tracking, passive tracking and/or full imaging is carried out until passive imaging resolves the target to a predetermined threshold. Once the predetermined target resolution threshold is met, passive tracking can be continued until the guided weapon is delivered to the target. In the event aberrations are introduced in the passive tracking causing loss of target or target ambiguity, LTD active tracking or full imaging can be re-engaged to redesignate the target or resolve passive tracking aberrations.

Figure 4:
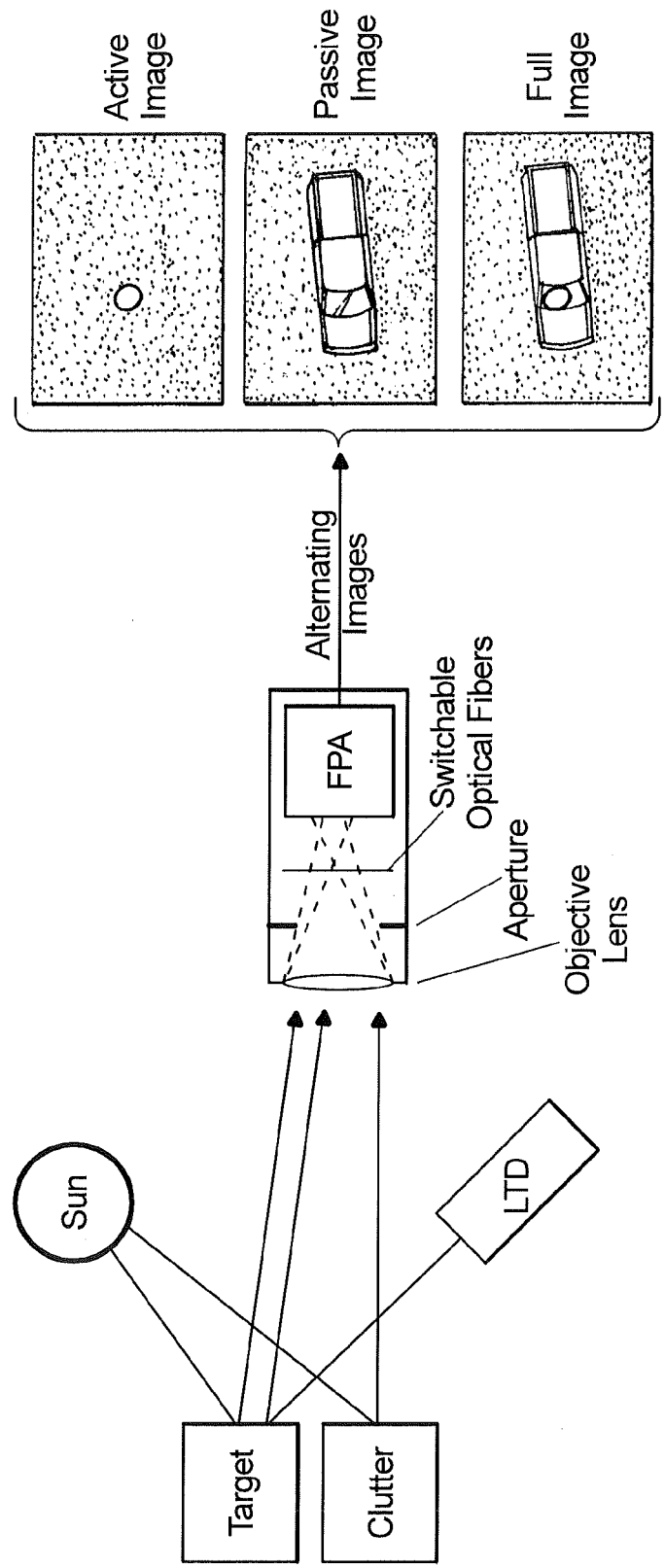
FIG. 4 schematically illustrates the time-division multiplex separation of active laser illuminated images from passive ambient illuminated images and from full (active & passive) images according to one embodiment described herein.

FIG. 4 illustrates alternating between active tracking, passive tracking and full imaging with a SAL/IR imaging seeker according to one embodiment described herein. As illustrated in FIG. 4, the FPA of the SAL/IR imaging seeker receives ambient radiation reflected from the target and LTD radiation reflected from the target along a common optical path provided by the objective optical assembly including an aperture. Active targeting, passive targeting and full imaging modes can be alternated by selective activation of the first optical filter(s) and second optical filter assembly to provide a target active image, passive image or full image.

The methods and systems described above and shown in the drawings, provide for superior properties including improved tracking. It should be recognized that these embodiments are merely illustrative of the principles of the present invention. Numerous modifications and adaptations thereof will be readily apparent to those skilled in the art without departing from the spirit and scope of the invention.

What is claimed is:

1. A dual-mode SAL/IR imaging seeker comprising:
a focal plane array (FPA);
an objective optical assembly providing a common optical path to the FPA for incident laser radiation of a first wavelength band and incident ambient radiation of a second wavelength band non-overlapping with the first wavelength band;
a first optical filter operable to selectively pass the incident laser radiation of the first wavelength band to the FPA in a transmissive mode and selectively block the incident laser radiation of the first wavelength band from the FPA in a non-transmissive mode, wherein the first wavelength band is from 10 nm to 20 nm wide within a wavelength range from 700 nm to 1700 nm; and
a second optical filter operable to selectively pass the incident ambient radiation of the second wavelength band to the FPA in a transmissive mode and selectively block the incident ambient radiation from the FPA in a non-transmissive mode, wherein the second wavelength band includes wavelengths in the range from 700 nm to 1700 nm not included in the first wavelength band.

2. The dual-mode SAL/IR imaging seeker of claim 1, wherein the first optical filter is electrically switchable between the transmissive mode and the non-transmissive mode.

3. The dual-mode SAL/IR imaging seeker of claim 1, wherein the first optical filter is configured and adapted to selectively pass incident laser radiation that includes scattered laser radiation.

4. The dual-mode SAL/IR imaging seeker of claim 1, wherein the first optical filter is configured and adapted to selectively pass incident laser radiation transmitted from a laser target designator.

5. The dual-mode SAL/IR imaging seeker of claim 1, wherein the second optical filter is configured and adapted to selectively pass incident ambient radiation that includes ambient infrared radiation.

6. The dual-mode SAL/IR imaging seeker of claim 1, wherein the second optical filter is configured and adapted to selectively pass incident ambient radiation that includes ambient infrared radiation reflected from a target.

7. The dual-mode SAL/IR imaging seeker of claim 1, wherein the optical bandpass filter assembly includes a plurality of second bandpass filters, each second bandpass filter covering a subset of wavelengths of the second wavelength band.

8. The dual-mode SAL/IR imaging seeker of claim 7, wherein the second bandpass filters are electrically switchable between the radiation transmissive mode and the non-transmissive mode.

9. The dual-mode SAL/IR imaging seeker of claim 1, wherein the focal plane is undivided for combined sensing of the laser radiation and imaging of the infrared radiation.

10. A method of making a dual-mode SAL/IR imaging seeker comprising:
providing a focal plane array (FPA);
providing an objective optical assembly establishing a common optical path to the FPA for incident laser radiation of a first wavelength band and incident ambient radiation of a second wavelength band non-overlapping with the first wavelength band;
positioning a first optical filter in the common optical path operable to selectively pass the incident laser radiation of the first wavelength band to the FPA in a transmissive mode and selectively block the incident laser radiation from the FPA in a non-transmissive mode, wherein the first wavelength band is from 10 nm to 20 nm wide within a wavelength range from 700 nm to 1700 nm; and
positioning a second optical filter assembly in the common optical path operable to selectively pass the incident ambient radiation of the second wavelength band to the FPA in a transmissive mode and selectively block the incident ambient radiation from the FPA in a non-transmissive mode, wherein the second wavelength band includes wavelengths in the range from 700 nm to 1700 nm not included in the first wavelength band.

11. A method of guiding a weapon to a target comprising:
actively acquiring and tracking a target with a dual-mode SAL/IR imaging system by substantially isolating laser radiation of a first wavelength band reflected from the target from ambient infrared radiation reflected from the target and sensing the isolated laser radiation with a focal plane array (FPA) of the dual mode SAL/IR imaging system, wherein the dual-mode SAL/IR system includes:
an objective optical assembly providing a common optical path to the FPA for incident laser radiation of a first wavelength band and incident ambient infrared radiation of a second wavelength band non-overlapping with the first wavelength band;
a first optical filter operable to selectively pass the incident laser radiation of the first wavelength band to the FPA in a transmissive mode and selectively block the incident laser radiation from the FPA in a non-transmissive mode, wherein the first wavelength band is from 10 nm to 20 nm wide within a wavelength range from 700 nm to 1700 nm; and
a second optical filter assembly operable to selectively pass the incident ambient infrared radiation of the second wavelength band to the FPA in a transmissive mode and selectively block the incident ambient infrared radiation from the FPA in a non-transmissive mode, wherein the second wavelength band includes wavelengths in the range from 700 nm to 1700 nm not included in the first wavelength band.

12. The method of claim 11, wherein isolating the reflected laser radiation of the first wavelength band includes placing the first optical filter in the-transmissive mode and placing the second optical filter assembly in the non-transmissive mode.

13. The method of claim 11 further comprising switching from active tracking of the target to passive imaging and tracking of the target with the SAL/IR imaging system by selectively blocking the reflected laser radiation from the FPA and passing the ambient infrared radiation reflected from the target to the FPA.

14. The method of claim 13, wherein selectively blocking the reflected laser radiation and passing the reflected ambient infrared radiation includes placing the first optical filter in the non-transmissive mode and placing the second optical filter assembly in transmissive mode.

15. The method of claim 14, further comprising alternating between active tracking and passive tracking of the target until the weapon is delivered to the target.

16. The method of claim 14, further comprising alternating between active and passive tracking of the target until passive imaging resolves the target to a predetermined threshold.

17. The method of claim 16, wherein passive tracking continues until the weapon is delivered to the target.

* * * * *